US009826321B2

(12) United States Patent
El-Hoiydi et al.

(10) Patent No.: US 9,826,321 B2
(45) Date of Patent: Nov. 21, 2017

(54) WIRELESS SOUND TRANSMISSION SYSTEM AND METHOD

(71) Applicant: SONOVA AG, Stäfa (CH)

(72) Inventors: Amre El-Hoiydi, Neuchâtel (CH); Marc Secall, Constantine (CH)

(73) Assignee: Sonova AG, Stäfa (CH)

( * ) Notice: Subject to any disclaimer, the term of this patent is extended or adjusted under 35 U.S.C. 154(b) by 0 days.

(21) Appl. No.: 15/589,033

(22) Filed: May 8, 2017

(65) Prior Publication Data

US 2017/0245067 A1 Aug. 24, 2017

Related U.S. Application Data

(62) Division of application No. 14/008,792, filed as application No. PCT/EP2011/054901 on Mar. 30, 2011, now Pat. No. 9,681,236.

(51) Int. Cl.

| | |
|---|---|
| ***H04B 3/00*** | (2006.01) |
| ***H04R 25/00*** | (2006.01) |
| ***G10L 19/005*** | (2013.01) |
| ***G10L 19/018*** | (2013.01) |
| ***H04R 27/00*** | (2006.01) |

(52) U.S. Cl.

CPC .......... *H04R 25/554* (2013.01); *G10L 19/005* (2013.01); *G10L 19/018* (2013.01); *H04R 25/558* (2013.01); *H04R 27/00* (2013.01); *H04R 2227/003* (2013.01); *H04R 2420/07* (2013.01)

(58) Field of Classification Search

CPC combination set(s) only.
See application file for complete search history.

(56) References Cited

U.S. PATENT DOCUMENTS

| | | | |
|---|---|---|---|
| 6,404,891 | B1 | 6/2002 | Seitz et al. |
| 6,421,802 | B1 | 7/2002 | Schildbach et al. |
| 7,648,919 | B2 | 1/2010 | Tran et al. |
| 7,844,292 | B2 | 11/2010 | Shamburger |

(Continued)

FOREIGN PATENT DOCUMENTS

| | | | |
|---|---|---|---|
| EP | 1 241 664 | A2 | 9/2002 |
| EP | 1 883 273 | A1 | 1/2008 |

(Continued)

*Primary Examiner* — Amir Etesam
(74) *Attorney, Agent, or Firm* — Sonova AG

(57) ABSTRACT

Method for providing sound to at least one user, involves supplying audio signals from an audio signal source to a transmission unit; compressing the audio signals to generate compressed audio data; transmitting compressed audio data from the transmission unit to at least one receiver unit; decompressing the compressed audio data to generate decompressed audio signals; and stimulating the hearing of the user(s) according to decompressed audio signals supplied from the receiver unit. During certain time periods, transmission of compressed audio data is interrupted, and instead, at least one control data block is generated by the transmission unit in such a manner that audio data transmission is replaced by control data block transmission, thereby temporarily interrupting flow of received compressed audio data, each control data block includes a marker recognized by the at least one receiver unit as a control data block and a command for control of the receiver unit.

15 Claims, 9 Drawing Sheets

(56) References Cited

U.S. PATENT DOCUMENTS

| | | | | |
|---|---|---|---|---|
| 8,019,386 | B2 | 9/2011 | Dunn et al. | |
| 8,229,146 | B2 | 7/2012 | Nielsen | |
| 8,266,311 | B2 | 9/2012 | Virdi et al. | |
| 8,345,900 | B2 | 1/2013 | Marquis et al. | |
| 9,681,236 | B2 * | 6/2017 | El-Hoiydi | H04R 25/554 |
| 2007/0086601 | A1 | 4/2007 | Mitchler | |
| 2010/0195836 | A1 | 8/2010 | Platz | |
| 2011/0093628 | A1 * | 4/2011 | Bulgin | G06F 5/14<br>710/56 |

FOREIGN PATENT DOCUMENTS

| | | | |
|---|---|---|---|
| WO | 2007/045081 | A1 | 4/2007 |
| WO | 2008/138365 | A1 | 11/2008 |
| WO | WO/144537 | A1 | 12/2009 |

* cited by examiner

Prior art FIG. 11B

Prior art FIG. 11C

WIRELESS SOUND TRANSMISSION SYSTEM AND METHOD

CROSS REFERENCE TO RELATED APPLICATION

This application is a division of commonly owned, co-pending U.S. patent application Ser. No. 14/008,792, filed Nov. 8, 2013, which is a §371 of PCT/EP2011/054901 filed Mar. 30, 2011.

BACKGROUND OF THE INVENTION

Field of the Invention

The invention relates to a system and a method for providing sound to at least one user, wherein audio signals from an audio signal source, such as a microphone for capturing a speaker's voice, are transmitted via a wireless link to a receiver unit, such as an audio receiver for a hearing aid, from where the audio signals are supplied to means for stimulating the hearing of the user, such as a hearing aid loudspeaker.

Description of Related Art

Typically, wireless microphones are used by teachers teaching hearing impaired persons in a classroom (wherein the audio signals captured by the wireless microphone of the teacher are transmitted to a plurality of receiver units worn by the hearing impaired persons listening to the teacher) or in cases where several persons are speaking to a hearing impaired person (for example, in a professional meeting, wherein each speaker is provided with a wireless microphone and with the receiver units of the hearing impaired person receiving audio signals from all wireless microphones). Another example is audio tour guiding, wherein the guide uses a wireless microphone.

Another typical application of wireless audio systems is the case in which the transmission unit is designed as an assistive listening device. In this case, the transmission unit may include a wireless microphone for capturing ambient sound, in particular from a speaker close to the user, and/or a gateway to an external audio device, such as a mobile phone; here the transmission unit usually only serves to supply wireless audio signals to the receiver unit(s) worn by the user.

Typically, the wireless audio link is an FM (frequency modulation) radio link operating in the 200 MHz frequency band. Examples of analog wireless FM systems, particularly suited for school applications, are described in European Patent Application EP 1 864 320 A1 and corresponding U.S. Pat. No. 7,648,919 B2 and in International Patent Application Publication WO 2008/138365 A1 and corresponding U.S. Pat. No. 8,345,900 B2.

In recent systems, analog FM transmission technology has been replaced by technology employing digital modulation techniques for audio signal transmission, most of them working on other frequency bands than the former 200 MHz band.

U.S. Pat. No. 8,019,386 B2 relates to a hearing assistance system comprised of a plurality of wireless microphones worn by different speakers and a receiver unit worn at a loop around a listener's neck, with the sound being generated by a headphone connected to the receiver unit, wherein the audio signals are transmitted from the microphones to the receiver unit by using a spread spectrum digital signals. The receiver unit controls the transmission of data, and it also controls the pre-amplification gain level applied in each transmission unit by sending respective control signals via the wireless link.

International Patent Application Publication WO 2008/098590 A1 and corresponding U.S. Patent Application Publication 2010/019836 A1 relate to a hearing assistance system comprising a transmission unit having at least two spaced apart microphones, wherein a separate audio signal channel is dedicated to each microphone, and wherein at least one of the two receiver units worn by the user at the two ears is able to receive both channels and to perform audio signal processing at ear level, such as acoustic beam forming, by taking into account both channels.

In wireless digital sound transmission systems, not only audio data is to be transmitted but also control data, for example, for controlling the volume of playback of audio signals, for configuring the operation mode of the devices, for querying the battery status of the devices, etc. The transmission of such control data causes, compared to audio data transmission alone, overhead to the system in current consumption and/or delay which should be minimized.

There are certain known methods for concurrent transmission of audio data and control data. A schematic overview concerning the basic types of such concurrent transmission is shown in FIGS. 11A to 11D.

In general, transmission of control data can be made either "out-of-band" or "in-band". In this context "out-of-band" means that different logical communication channels are used for audio data transmission and control data transmission, i.e., audio and control data are transmitted in separate digital streams. Such technique is used, for example, in mobile and fixed telephony networks. "In-band" means that control data is somehow combined with the audio data for transmission. In digital transmission of audio signals, usually the audio data as provided by the analog-to-digital converter is compressed prior to transmission by using an appropriate audio-codec. The resulting compressed audio data stream can be either transmitted sample-by-sample, i.e., as an essentially continuous stream, or in packets of samples.

FIG. 11D shows one way to control how data can be inserted in an in-band manner into a sample-by-sample transmitted audio stream. In the example shown in FIG. 11D control information is added to or mixed with the audio signal stream 52 prior to compression, wherein the control information may be represented by audible DTMF signals (see, for example, ITU recommendation G.23), or the control information may be inserted into the audio band by using inaudible spread spectrum techniques (see, for example, U.S. Pat. No. 7,844,292 B2). The mixture 49 of control information and audio information then undergoes compression prior to being transmitted.

Another known example of in-band control data transmission for sample-by-sample audio transmission is shown in FIG. 11A, wherein control data bits are interleaved with audio data bits in the compressed audio data stream, thereby forming a combined data stream 55. For example, the least significant one or two audio bits per octet may be substituted by control data bits, see for example, ITU recommendations G.722, G.725 and H.221, which standards are used in telephony networks.

A similar principle of in-band control data transmission for a packet-based audio data transmission is shown in FIG. 11B, wherein in each audio data packet a control field is reserved for transmitting control data together with audio data in a common packet 55A, 55B, 55C, see for example, International Patent Application Publication WO 2007/

045081 A1 and corresponding U.S. Patent Application Publication 2007/0086601 A1 which relate to wireless audio signal transmission from a wireless microphone to a plurality of hearing instruments.

In FIG. 11C, an example of an out-of-band control data transmission is shown, wherein control data is transmitted as dedicated control data packets 50 which are separate from the audio data packets 51A, 51B, 51C. An example of such data transmission is described in U.S. Pat. No. 8,266,311 B2. Such a method is also used in the Bluetooth standard for headset profile, where control data is transmitted in different time slots (using ACL links) than those allocated for audio data (using SCO links).

Any such combined audio and control data transmission method either introduces a large delay in the transmission of the control commands or introduces a large overhead in terms of bit rate reserved for control traffic, which translates into a power consumption overhead.

SUMMARY OF THE INVENTION

It is an object of the invention to provide for a digital sound transmission method and system, wherein control data transmission is achieved in such a manner that both power consumption overhead and delay in control data transmission is minimized.

According to the invention, this object is achieved by a method and a system as described herein.

The invention is beneficial in that, by replacing part of the audio data by control data blocks, with each control data block including a marker for being recognized by the receiver unit(s) as a control data block and a command for being used for control of the receiver unit, delay in the command transmission can be kept very small (as compared to, for example, the interleaved control data transmission shown in FIG. 11A), while no power consumption overhead due to control data transmission is required. In order to at least partially compensate for the replacement of part of the audio data by control data, preferably an action is taken for masking the temporary absence of received audio data, such as generating a masking output audio signal, such as a beep signal, muting of the audio signal output of the receiver unit or applying a packet loss concealment extrapolation algorithm to the received compressed audio data packets. In the methods defined in claims 15 and 21, which includes redundant audio data packet transmission, redundant copies of the audio data packet replaced by a control data packet can be used for masking the temporary absence of received audio data.

Hereinafter, examples of the invention will be illustrated by reference to the accompanying drawings.

BRIEF DESCRIPTION OF THE DRAWINGS

FIGS. 11A to 11D illustrate examples of combined audio data/control data transmission according to the prior art;

DETAILED DESCRIPTION OF THE INVENTION

Figure 11A:
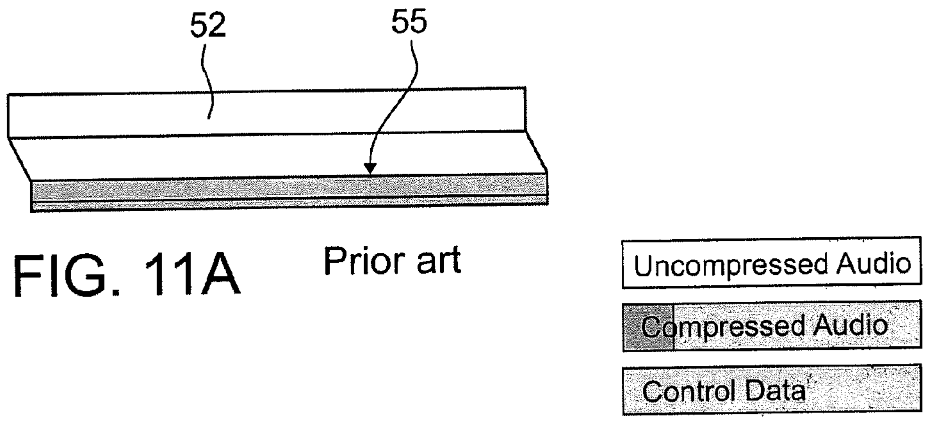
FIG. 11A Prior art
Figure 11D:
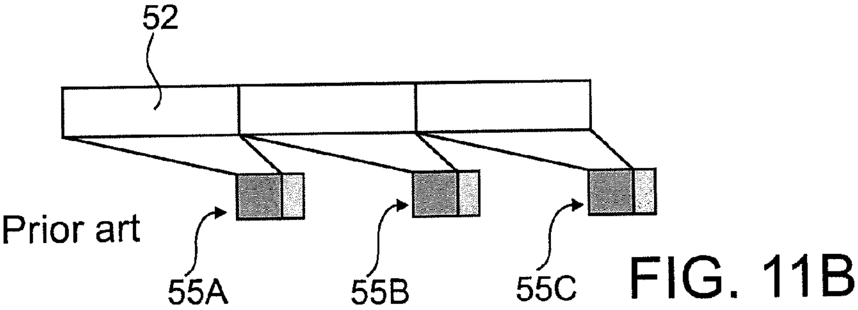
FIG. 11D Prior art
Figure 11D:
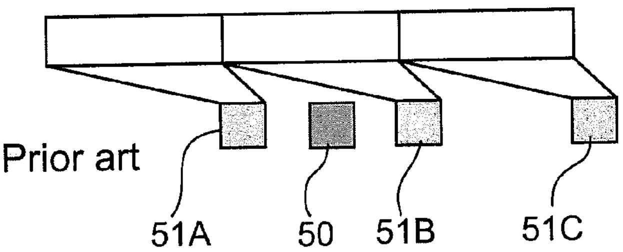
FIG. 11D Prior art
Figure 11D:
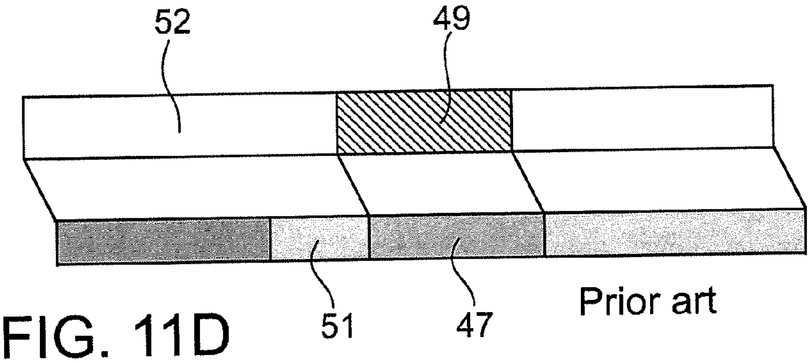
FIG. 11D Prior art
Figure 12:
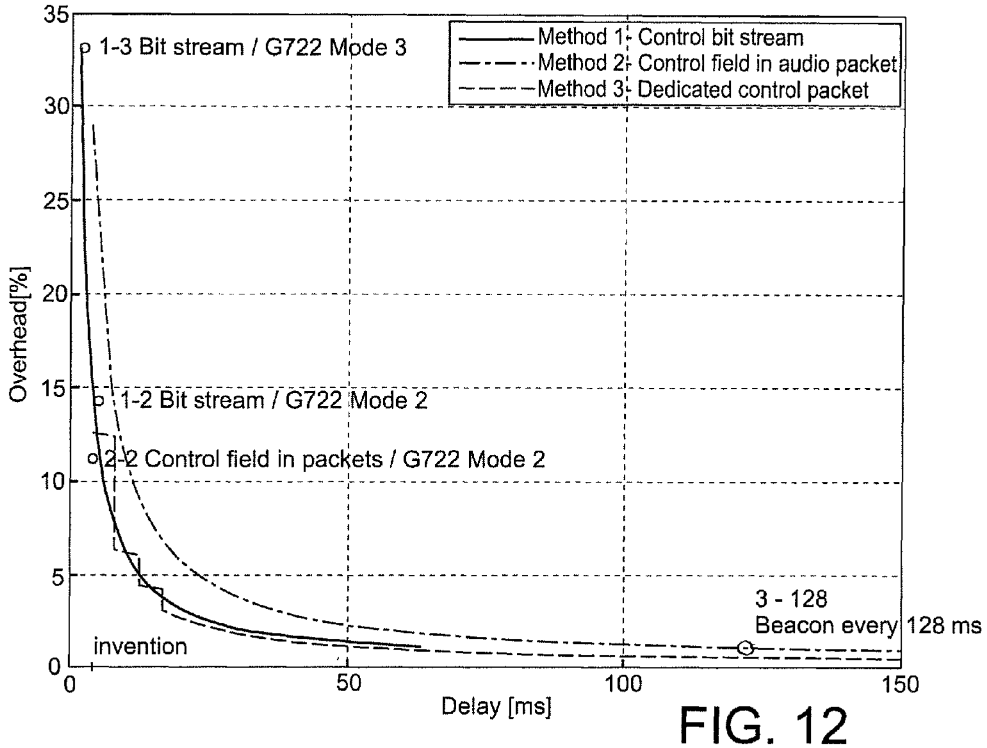
FIG. 12 is a plot of the required overhead for control data transmission versus delay of control data transmission in which the invention is compared to methods according to the prior art.

In FIG. 12, some examples of the overhead (in power consumption) required by the control data transmission in the prior art methods according to FIGS. 11A to 11C are shown versus the delay of the control data transmission. It can be seen from FIG. 12, that there is a trade-off between overhead and delay, i.e., an implementation providing for little delay requires a large overhead and vice versa. In the following, the curves of FIG. 12 will be explained in more detail.

First, the method of FIG. 11A using control data bits interleaved with audio data bits will be analyzed. Let us assume that an audio stream with bit rate $D_A$ must be transmitted, and that one bit of control is added every k bits of audio. The total bit rate of the combined audio/control channel is then:

$$D_{AC} = \frac{k+1}{k} D_A.$$

The control channel overhead to the system is given by the relationship:

$$D_C = D_{AC} - D_A = D_A\left(\frac{k+1}{k} - 1\right) = \frac{D_A}{k}$$

The overhead caused by the control channel will be evaluated as the ratio between control bit rate and audio bit rate $O_1 = D_C/D_A$.

A control message is a packet starting with a start frame delimiter (of, e.g., a one byte size), followed by the command data (of, e.g., a 2 bytes size at minimum) and terminated with a CRC (of a 16 bits size at a minimum). This gives a control frame of size 5 bytes. The delay to get such a message through the control channel is:

$$T_1 = \frac{5 \cdot 8}{D_C}$$

The overhead versus delay curve for this method 1 is shown in FIG. 12. When using the G.722 codec, potential modes for meta-data that are specified are the addition of 1 bit of control data every 7 bits of audio data when using a 56 kbps audio bit rate (G.722 mode 2) or the addition of 2 bit control data every 6 bits of audio data when using a 48 kbps audio bit rate (G.722 mode 3). These two operating points are shown as circles at the right side of the solid line curve in FIG. 12 and are designated 1-2 and 1-3. These operating points introduce a low delay of 5 ms and 2.5 ms, but a high overhead of 14% and 33% respectively.

Next, the method of FIG. 11B using transmission of control data in a dedicated control field in the audio data packets will be analyzed. Let $N_A=256$ be the number of audio bits in a packet, $N_C$ be the number of control bits, and $N_O=60$ the number of overhead bits (including 20 bits guard time during which receiver waits for transmission to start, 3 bytes address and 2 bytes CRC).

The resulting total bit rate is $$D_{AC} = \frac{N_A + N_C + N_O}{T_A},$$

where $T_A=4$ ms is the interval between audio packets.

The overhead is computed as the ratio between the number of bits reserved for control divided by the number of audio and base overhead bits:

$$O_2 = \frac{N_C}{N_A + N_O}$$

A control frame size of 5 bytes is considered, including, as for method 1, one byte start frame delimiter, 2 bytes command and 2 bytes CRC. The delay is computed as the number of 4 ms periods required to transmit the 5 bytes control frame:

$$T_2 = T_A \cdot \lceil 40/N_C \rceil$$

When the number of control bits $N_C$ is equal to the size of a control message, the delay becomes minimum with $T_2=T_A$.

The overhead versus delay curve for this method is shown in FIG. 12.

If the G.722 standard is used in mode 2 and if the interval between audio packet is kept at 4 ms, the number of audio bits becomes $N_A=224$. If the radio packets are limited to 256 bits, this leaves hence 32 bits for control information. The delay in this case would be 4 ms, as 2 bytes command and 2 bytes CRC can be transmitted in a single radio packet. There is no need of start frame delimiter since, in this case, control frames are not segmented over several radio packets. The overhead in this case is:

$$O_2 = \frac{32}{224 + 60} = 11.3\%.$$

This operating point is shown as a circle in FIG. 12 with label 2-2 at the left side of the solid line curve.

Finally, the method of FIG. 11C using dedicated control data packets separate from the audio data packets will be analyzed. The size of a dedicated control packet is at the minimum the radio overhead bits $N_O=60$ and the size of a control message (without start frame delimiter) $N_C=32$. The overhead (on the ear-level receiver) and the delay depend on the period with which control packets are received. Let $T_C$ be the control packet reception period. The overhead is the ratio between the power to receive control packets and the power needed to receive audio packets:

$$O_3 = \frac{(N_O + N_C)/T_C}{(N_O + N_A)/T_A}$$

The (maximum) delay with this method is the interval between beacon reception:

$$T_3 = T_C$$

The overhead versus delay curve for this method is shown in FIG. 12. An operating point with $T_C=128$ ms is illustrated by a circle designated 3-128 below the dash line curve in FIG. 12.

The present invention relates to a system for providing hearing assistance to at least one user, wherein audio signals are transmitted, by using a transmission unit comprising a digital transmitter, from an audio signal source via a wireless digital link to at least one receiver unit, from where the audio signals are supplied to means for stimulating the hearing of the user, typically a loudspeaker, wherein control data is to be transmitted via the digital link in a manner that the trade-off between delay in the transmission of the control commands and introduction of a large power consumption overhead involved in the prior art methods of FIGS. 11A to 11D is avoided.

Figure 1:
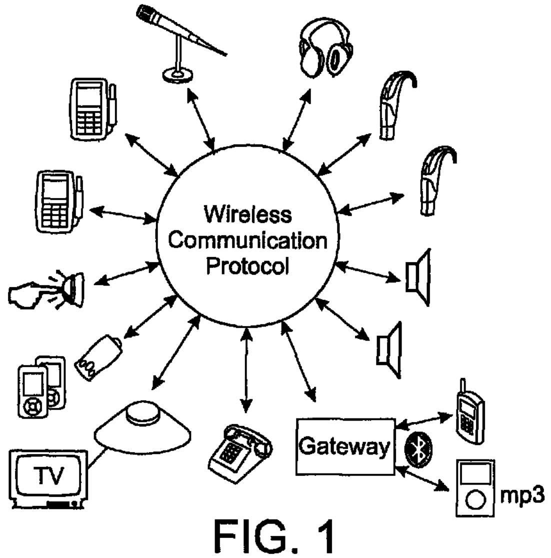
FIG. 1 is a schematic view of audio components which can be used with a system according to the invention.

As shown in FIG. 1, the device used on the transmission side may be, for example, a wireless microphone used by a speaker in a room for an audience; an audio transmitter having an integrated or a cable-connected microphone which are used by teachers in a classroom for hearing-impaired pupils/students; an acoustic alarm system, like a door bell, a fire alarm or a baby monitor; an audio or video player; a television device; a telephone device; a gateway to audio sources like a mobile phone, music player; etc. The transmission devices include body-worn devices as well as fixed devices. The devices on the receiver side include headphones, all kinds of hearing aids, ear pieces, such as for prompting devices in studio applications or for covert communication systems, and loudspeaker systems. The receiver devices may be for hearing-impaired persons or for normal-hearing persons. Also, on the receiver side, a gateway could be used which relays audio signal received via a digital link to another device comprising the stimulation means.

The system may include a plurality of devices on the transmission side and a plurality of devices on the receiver side, for implementing a network architecture, usually in a master-slave topology.

The transmission unit typically comprises or is connected to a microphone for capturing audio signals, which is typically worn by a user, with the voice of the user being transmitted via the wireless audio link to the receiver unit.

The receiver unit typically is connected to a hearing aid via an audio shoe or is integrated within a hearing aid.

In addition to the audio signals, control data is transmitted bi-directionally between the transmission unit and the receiver unit. Such control data may include, for example, volume control or a query regarding the status of the receiver unit or the device connected to the receiver unit (for example, battery state and parameter settings).

Figure 2:
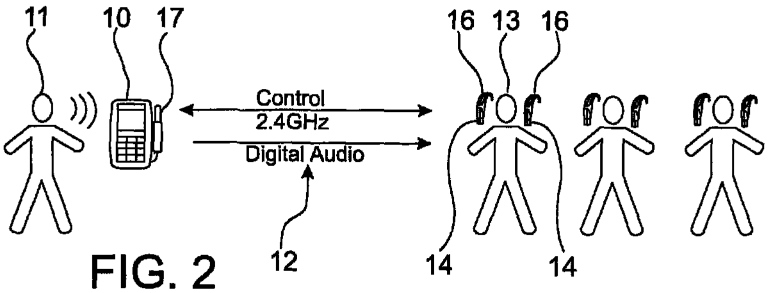
FIGS. 2 to 4 schematically depicts various examples of methods for using a system according to the invention.

In FIG. 2 a typical use case is shown schematically, wherein a body-worn transmission unit 10 comprising a microphone 17 is used by a teacher 11 in a classroom for transmitting audio signals corresponding to the teacher's voice via a digital link 12 to a plurality of receiver units 14, which are integrated within or connected to hearing aids 16 worn by hearing-impaired pupils/students 13. The digital link 12 is also used to exchange control data between the transmission unit 10 and the receiver units 14. Typically, the transmission unit 10 is used in a broadcast mode, i.e., the same signals are sent to all receiver units 14.

Figure 3:
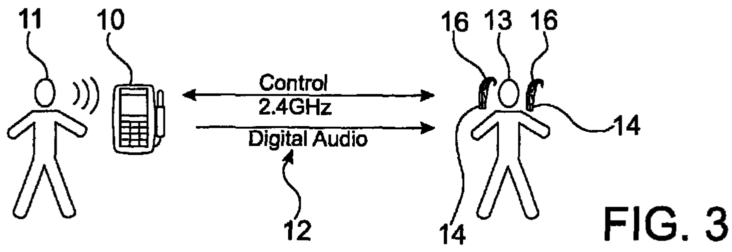

Another typical use case is shown in FIG. 3, wherein a transmission 10 having an integrated microphone is used by a hearing-impaired person 13 wearing receiver units 14 connected to or integrated within a hearing aid 16 for capturing the voice of a person 11 speaking to the person 13. The captured audio signals are transmitted via the digital link 12 to the receiver units 14.

Figure 4:
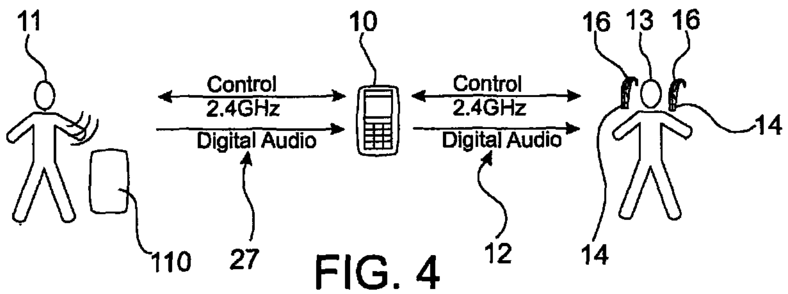

A modification of the use case of FIG. 3 is shown in FIG. 4, wherein the transmission unit 10 is used as a relay for relaying audio signals received from a remote transmission unit 110 to the receiver units 14 of the hearing-impaired person 13. The remote transmission unit 110 is worn by a speaker 11 and comprises a microphone for capturing the voice of the speaker 11, thereby acting as a companion microphone.

According to a variant of the embodiments shown in FIGS. 2 to 4, the receiver units 14 could be designed as neck-worn devices comprising a transmitter for transmitting the received audio signals via an inductive link to an ear-worn device, such as a hearing aid.

The transmission units 10, 110 may comprise an audio input for a connection to an audio device, such as a mobile phone, a FM radio, a music player, a telephone or a TV device, as an external audio signal source.

In each of such use cases, the transmission unit 10 usually comprises an audio signal processing unit (not shown in FIGS. 2 to 4) for processing the audio signals captured by the microphone prior to being transmitted.

Figure 5:
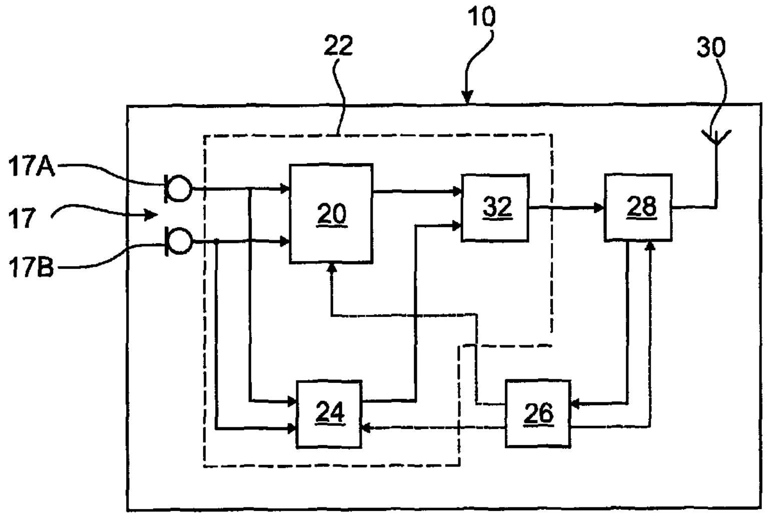
FIG. 5 is a block diagram of an example of a transmission unit to be used with the invention.

An example of a transmission unit 10 is shown in FIG. 5. The transmission unit 10 comprises a microphone arrangement 17 for capturing audio signals from the respective speaker's 11 voice, an audio signal processing unit 20 for processing the captured audio signals, a digital transmitter 28 and an antenna 30 for transmitting the processed audio signals as an audio stream 19 composed of audio data packets. The audio signal processing unit 20 serves to compress the audio data using an appropriate audio codec, as it is known in the art. The compressed audio stream 19 forms part of a digital audio link 12 established between the transmission units 10 and the receiver unit 14, which link also serves to exchange control data packets between the transmission unit 10 and the receiver unit 14, with such control data packets being inserted as blocks into the audio data, as will be explained below in more detail with regard to FIGS. 13 to 16. The transmission units 10 may include additional components, such as a voice activity detector (VAD) 24. The audio signal processing unit 20 and such additional components may be implemented by a digital signal processor (DSP) indicated at 22. In addition, the transmission units 10 also may comprise a microcontroller 26 acting on the DSP 22 and the transmitter 28. The microcontroller 26 may be omitted in case that the DSP 22 is able to take over the function of the microcontroller 26. Preferably, the microphone arrangement 17 comprises at least two spaced-apart microphones 17A, 17B, the audio signals of which may be used in the audio signal processing unit 20 for acoustic beamforming in order to provide the microphone arrangement 17 with a directional characteristic.

The VAD 24 uses the audio signals from the microphone arrangement 17 as an input in order to determine the times when the person 11 using the respective transmission unit 10 is speaking. The VAD 24 may provide a corresponding control output signal to the microcontroller 26 in order to have, for example, the transmitter 28 sleep during times when no voice is detected and to wake up the transmitter 28 during times when voice activity is detected. In addition, a control command corresponding to the output signal of the VAD 24 may be generated and transmitted via the wireless link 12 in order to mute the receiver units 14 or saving power when the user 11 of the transmission unit 10 does not speak. To this end, a unit 32 is provided which serves to generate a digital signal comprising the audio signals from the processing unit 20 and the control data generated by the VAD 24, which digital signal is supplied to the transmitter 28. The unit 32 acts to replace audio data by control data blocks, as will be explained in more detail below with regard to FIGS. 13 to 16. In addition to the VAD 24, the transmission unit 10 may comprise an ambient noise estimation unit (not shown in FIG. 2) which serves to estimate the ambient noise level and which generates a corresponding output signal which may be supplied to the unit 32 for being transmitted via the wireless link 12.

According to one embodiment, the transmission units 10 may be adapted to be worn by the respective speaker 11 below the speaker's neck, for example, as a lapel microphone or as a shirt collar microphone.

Figure 6:
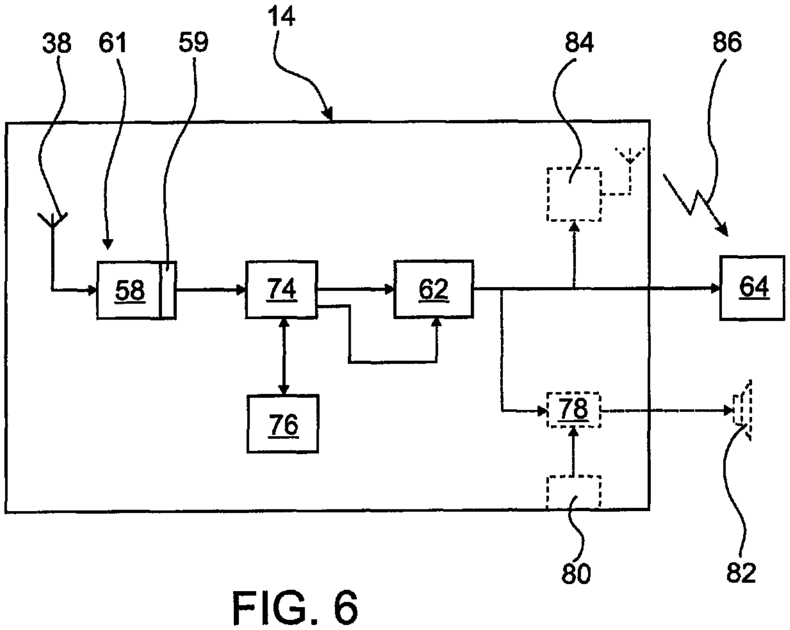
FIG. 6 is a block diagram of an example of a receiver unit to be used with the invention.

An example of a digital receiver unit 14 is shown in FIG. 6, according to which the antenna arrangement 38 is connected to a digital transceiver 61 including a demodulator 58 and a buffer 59. The signals transmitted via the digital link 12 are received by the antenna 38 and are demodulated in the digital radio receivers 61. The demodulated signals are supplied via the buffer 59 to a DSP 74 acting as processing unit which separates the signals into the audio signals and the control data and which is provided for advanced processing, e.g., equalization, of the audio signals according to the information provided by the control data. The processed audio signals, after digital-to-analog conversion, are supplied to a variable gain amplifier 62 which serves to amplify the audio signals by applying a gain controlled by the control data received via the digital link 12. The amplified audio signals are supplied to a hearing aid 64. The receiver unit 14 also includes a memory 76 for the DSP 74.

Rather than supplying the audio signals amplified by the variable gain amplifier 62 to the audio input of a hearing aid 64, the receiver unit 14 may include a power amplifier 78 which may be controlled by a manual volume control 80 and which supplies power amplified audio signals to a loudspeaker 82 which may be an ear-worn element integrated within or connected to the receiver unit 14. Volume control also could be done remotely from the transmission unit 10 by transmitting corresponding control commands to the receiver unit 14.

Another alternative implementation of the receiver may be a neck-worn device having a transmitter 84 for transmitting the received signals via with an magnetic induction link 86 (analog or digital) to the hearing aid 64 (as indicated by dotted lines in FIG. 6).

In general, the role of the microcontroller 24 could also be taken over by the DSP 22. Also, signal transmission could be limited to a pure audio signal, without adding control and command data.

Details of the protocol of the digital link 12 will be discussed by reference to FIGS. 7 to 10. Typical carrier frequencies for the digital link 12 are 865 MHz, 915 MHz and 2.45 GHz, wherein the latter band is preferred. Examples of the digital modulation scheme are PSK/FSK (Pre-Shared Keying/Frequency-Shift Keying), ASK (Amplitude Shift Keying) or combined amplitude and phase modulations, such as QPSK (Quadrature Phase-Shift Keying), and variations thereof (for example, GFSK (Gaussian Frequency-Shift Keying)).

The preferred codec used for encoding the audio data is sub-band ADPCM (Adaptive Differential Pulse-Code Modulation).

In addition, packet loss concealment (PLC) may be used in the receiver unit. PLC is a technique which is used to mitigate the impact of lost audio packets in a communication system, wherein typically the previously decoded samples are used to reconstruct the missing signal using techniques such as wave form extrapolation, pitch synchronous period repetition and adaptive muting.

Figure 7:
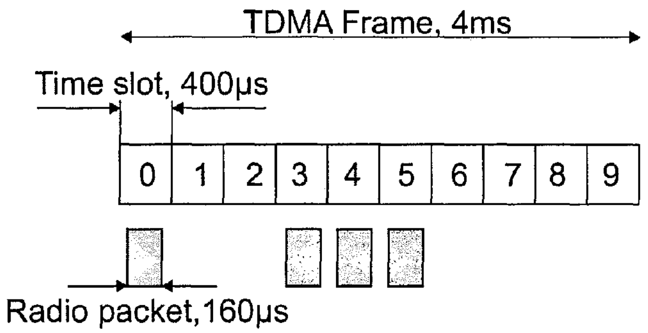
FIG. 7 is an example of the TDMA frame structure of the digital link of the invention.

Preferably, data transmission occurs in the form of TDMA (Time Division Multiple Access) frames comprising a plurality (for example, 10) of time slots, wherein in each slot one data packet may be transmitted. In FIG. 7 an example is shown wherein the TDMA frame has a length of 4 ms and is divided into 10 time slots of 400 μs, with each data packet having a length of 160 μs.

Preferably, a slow frequency hopping scheme is used, wherein each slot is transmitted at a different frequency according to a frequency hopping sequence calculated by a given algorithm in the same manner by the transmitter unit 10 and the receiver units 14, wherein the frequency sequence is a pseudo-random sequence depending on the number of the present TDMA frame (sequence number), a constant odd number defining the hopping sequence (hopping sequence ID) and the frequency of the last slot of the previous frame.

The first slot of each TDMA frame (slot 0 in FIG. 7) may be allocated to the periodic transmission of a beacon packet which contains the sequence number numbering the TDMA frame and other data necessary for synchronizing the network, such as information relevant for the audio stream, such as description of the encoding format, description of the audio content, gain parameter, surrounding noise level, etc., information relevant for multi-talker network operation, and optionally control data for all or a specific one of the receiver units.

Figure 8:
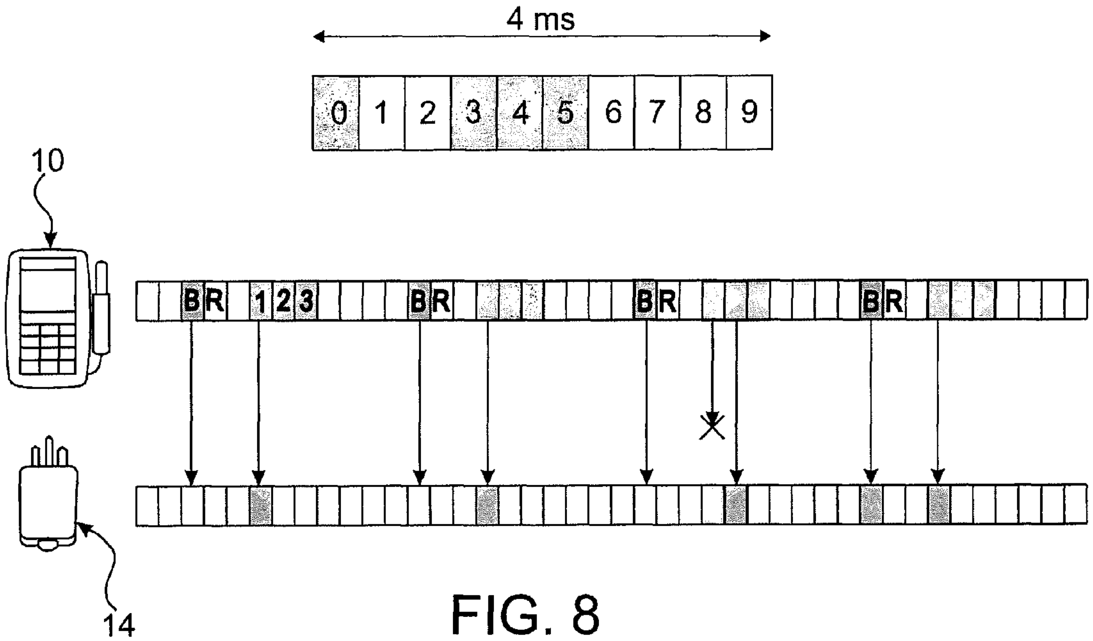
FIG. 8 is an illustration of an example of the protocol of the digital link used in a system according to the invention.

The second slot (slot 1 in FIG. 7) may be allocated to the reception of response data from slave devices (usually the receiver units) of the network, whereby the slave devices can respond to requests from the master device through the beacon packet. At least some of the other slots are allocated to the transmission of audio data packets (which, as will be explained below with regard to FIGS. 15 and 16, may be replaced at least in part by control data packets, where necessary), wherein each audio data packet is repeated at least once, typically in subsequent slots. In the example shown in FIGS. 7 and 8 slots 3, 4 and 5 are used for three-fold transmission of a single audio data packet. The master device does not expect any acknowledgement from the slaves devices (receiver units), i.e., repetition of the audio data packets is done, in any case, irrespective of whether the receiver unit has correctly received the first audio data packet (which, in the example of FIGS. 7 and 8, is transmitted in slot 3) or not. Also, the receiver units are not individually addressed by sending a device ID, i.e., the same signals are sent to all receiver units (broadcast mode).

Rather than allocating separate slots to the beacon packet and the response of the slaves, the beacon packet and the response data may be multiplexed on the same slot, for example, slot 0.

The audio data is compressed in the transmission unit 10 prior to being transmitted.

Usually, in a synchronized state, each slave listens only to specific beacon packets (the beacon packets are needed primarily for synchronization), namely those beacon packets for which the sequence number and the ID address of the respective slave device fulfills a certain condition, whereby power can be saved. When the master device wishes to send a message to a specific one of the slave devices, the message is put into the beacon packet of a frame having a sequence number for which the beacon listening condition is fulfilled for the respective slave device. This is illustrated in FIG. 9, wherein the first receiver unit 14A listens only to the beacon packets sent by the transmission unit 10 in the frames number 1, 5, etc, the second receiver unit 14B listens only to the beacon packets sent by the transmission unit 10 in the frames number 2, 6, etc., and the third receiver unit 14C listens only to the beacon packet sent by the transmission unit 10 in the frames number 3, 7, etc.

Figure 9:
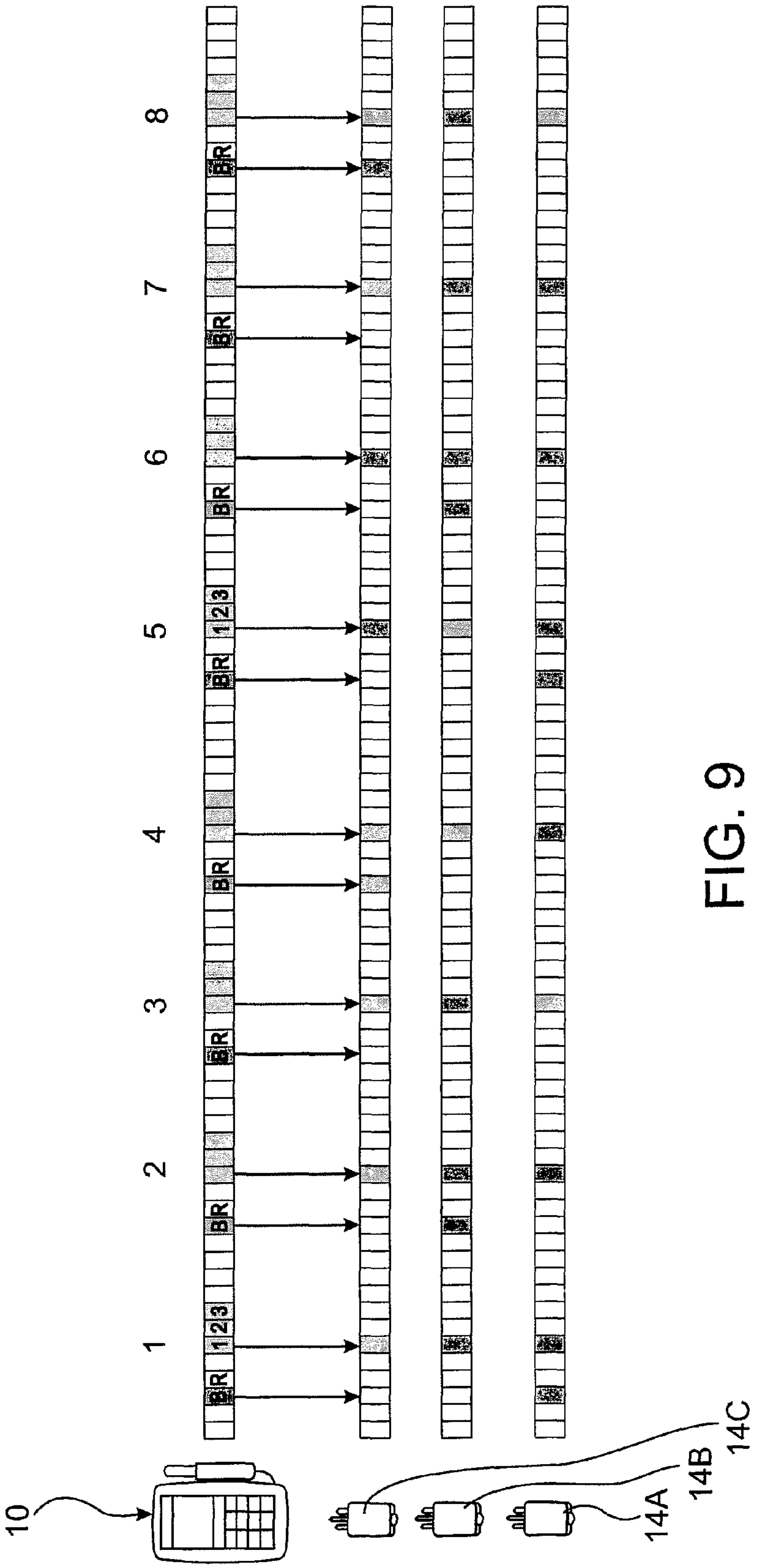
FIG. 9 is an illustration of an example of how a receiver unit in a system according to the invention listens to the signals transmitted via the digital audio link.

Periodically, all slave devices listen at the same time to the beacon packet, for example, to every tenth beacon packet (not shown in FIG. 9).

Slaves whose ID is not know to the network master will listen to the beacon satisfying the condition with an ID equal to 0.

Each audio data packet comprises a start frame delimiter (SFD), audio data and a frame check sequence, such as CRC (Cyclic Redundancy Check) bits. Preferably, the start frame delimiter is a 5 bytes code built from the 4 byte unique ID of the network master. This 5 byte code is called the network address, being unique for each network.

In order to save power, the receivers 61 in the receiver unit 14 are operated in a duty cycling mode, wherein each receiver wakes up shortly before the expected arrival of an audio packet. If the receiver is able to verify (by using the CRC at the end of the data packet), the receiver goes to sleep until shortly before the expected arrival of a new audio data packet (the receiver sleeps during the repetitions of the same audio data packet), which, in the example of FIGS. 7 and 8, would be the first audio data packet in the next frame. If the receiver determines, by using the CRC, that the audio data packet has not been correctly received, the receiver switches to the next frequency in the hopping sequence and waits for the repetition of the same audio data packet (in the example of FIGS. 7 and 8, the receiver then would listen to slot 4 as shown in FIG. 8, wherein in the third frame transmission of the packet in slot 3 fails).

In order to further reduce power consumption of the receiver, the receiver goes to sleep already shortly after the expected end of the SFD, if the receiver determines, from the missing SFD, that the packet is missing or has been lost. The receiver then will wake up again shortly before the expected arrival of the next audio data packet (i.e., the copy/repetition of the missing packet).

Figure 10:
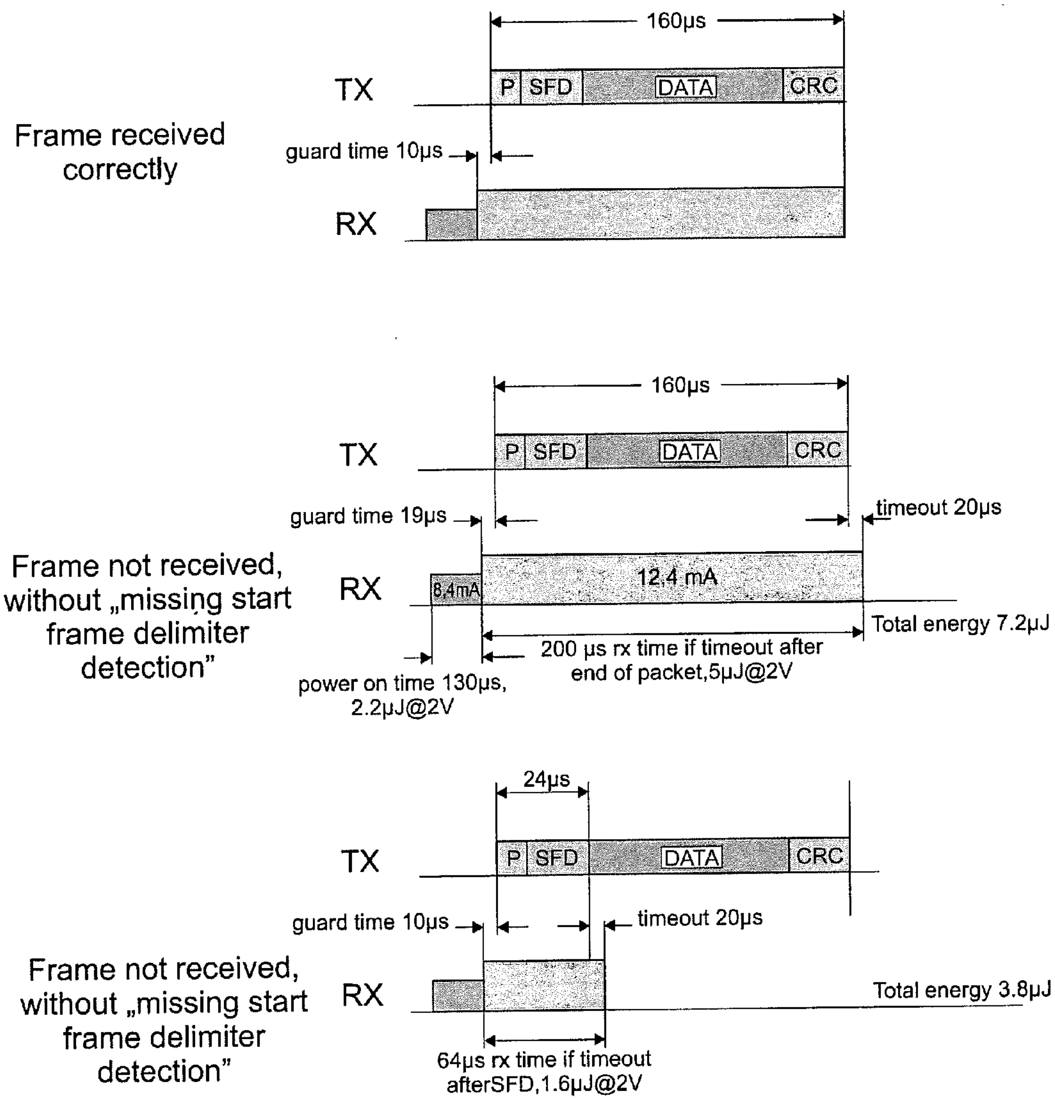
FIG. 10 is an illustration of an example of the protocol of the digital audio link used in an example of an assistive listening application with several receivers of a system according to the invention.

An example of duty cycling operation of the receiver is shown in FIG. 10, wherein the duration of each data packet is 160 μs and wherein the guard time (i.e., the time period by which the receiver wakes up earlier than the expected arrival time of the audio packet) is 10 μs and the timeout period (i.e., the time period for which the receiver waits after the expected end of transmission of the SFD and CRC, respectively) is 20 μs. It can be seen from FIG. 10 that, by sending the receiver to sleep already after timeout of SFD-transmission (when no SFD has been received), the power consumption can be reduced to about half of the value when the receiver is sent to sleep after timeout of CRC transmission.

According to the invention, control data may be transmitted instead of audio data, thereby avoiding any overhead in the system while minimizing delay of control data transmission. This is indicated in FIG. 12 by the asterix labeled "invention". For example, delay may be not more than 4 ms.

Figure 13:
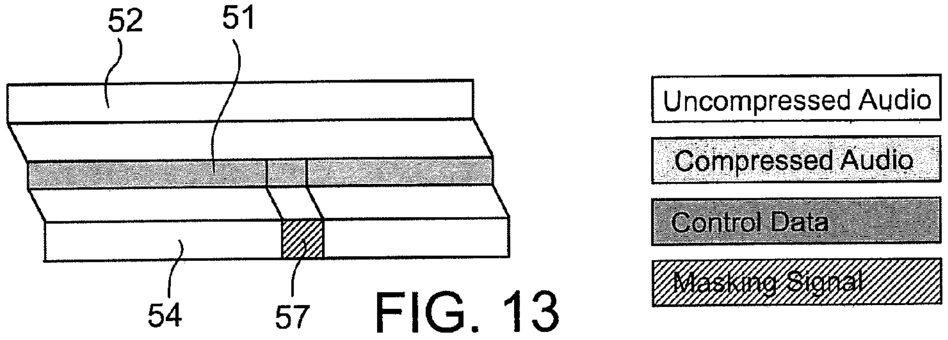
FIGS. 13 to 16 are examples of the principle of combined audio data and control data transmission according to the invention.

In FIG. 13, an example is schematically shown of how the invention may be applied to the type of audio data transmission of FIG. 11A, wherein compressed audio data is transmitted in a sample-by-same manner. According to FIG. 13, a control data block 50 is inserted into the compressed audio data stream 51 which is produced by compressing audio data stream 52. The control data block 50 is inserted into the compressed audio data stream 51 in such a manner that audio data is replaced by the control data block 50. Accordingly, there is a time window 53 during which no audio data compression takes place in the sense that the resulting compressed audio data stream 51 does not include compressed audio data from that time window 53. As a consequence, in the decompressed audio data stream 54 produced by decompressing the compressed audio data stream 51 there is a time window 57 for which no decompressed audio data is obtained (the time window 55 is shifted slightly with regard to the time window 53 due to the delay introduced by the data processing and the transmission process). During that time window 57, the receiver unit 14 may take some masking action for masking the temporary absence of received compressed audio data in the time window 57. Such masking action may include applying a pitch regeneration algorithm, generating a masking output audio signal, such as a beep signal which would also be used to confirm the reception of the command via the wireless link to the user, or muting of the audio signal output of the receiver unit 14. The masking strategy may need to introduce some delay in the received audio stream 54 in order to be able to fully receive a control frame before starting the masking action.

For enabling such masking action, the receiver unit 14 is adapted to detect the replacement of compressed audio data by a control data block 50.

Preferably, the control data block 50 starts with a predefined flag which allows the receiver unit 14 to distinguish control data from audio data, thereby acting as a marker. The flag is followed by the command and then by a CRC word. For example, the flag may comprise 32 bits, and also the CRC word may comprise 32 bits. With a 32 bits flag, the probability to find the flag in a random bit stream is $\frac{1}{2}^{32}$. Such an event will happen, on average, every $2^{32}/64{,}000=18$ hours with a 64 kbps compressed audio bit rate having a random 0/1 distribution. The flag should be selected in such a manner that it is unlikely to be found in a typical compressed audio stream.

If a flag is found in noise, it is very likely (probability: $1\frac{1}{2}^{32}$) that the CRC will be wrong and hence the command will not be applied.

The total size of the control data block 50, for example, may be 8 bytes (consisting of a 4 bytes flag, a 2 byte command and a 2 byte CRC). This corresponds to 16 samples in the G.722 standard or 1 ms with 16 kHz sampling.

As already mentioned above, the control data is supplied, together with audio data to the DSP 74, where it is used for control of the receiver unit 14.

Figure 14:
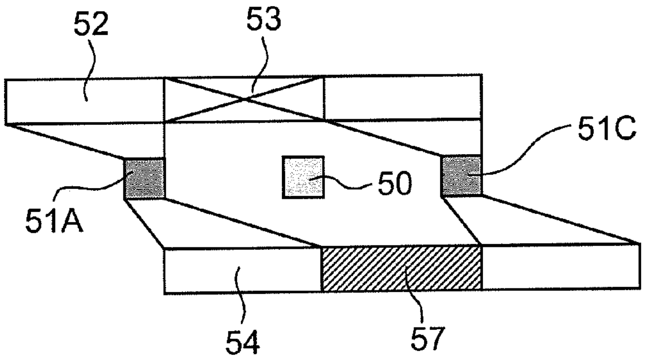

FIG. 14 relates to an example, wherein the invention is applied to a non-redundant packet-based audio data transmission scheme of the type shown also in FIGS. 11B and 11C. In this case, in the example of FIG. 14, uncompressed audio data 52 is compressed packet-wise in order to obtain audio data packets 51A and 51C. According to FIG. 14, the audio data packet which would have been transmitted between the packets 51A and 51C is replaced by a control data packet 50 so that, for the time window 53, no audio data is transmitted. Accordingly, there is a time window 57 (which is delayed with regard to the time window 53) during which no uncompressed audio data is available at the receiver unit 14, since no compressed audio data is received for this interval. Rather, the control data packet 50 is received at that time. Preferably, audio data compression is not interrupted during the time window 53, since the restart following an encoding interruption may create noise signals. For example, the G722 codec contains contains state information that must be continuously updated by encoding the signal; if the encoding is interrupted and restarted, the state information is not coherent and the encoder may produce a click. Thus, the compression preferably continues, but the output of the compression is discarded during the time windows 53 in which audio data transmission is omitted in favor of control data transmission.

During the time window 57, the receiver unit 14 may take a masking action for masking the temporary absence of received audio data, such as applying a packet loss concealment extrapolation algorithm, generating a masking output audio signal, such as a beep signal, or muting of the audio signal output of the receiver unit 14. The packet loss concealment algorithm, for example, could be G.722 appendix IV, and it could be applied in such a manner that no delay is added, via pre-computation of the concealment frame before it is known if this concealment frame will be required or not. Generating a beep signal would make sense of a beep is required anyway as a feedback to the user for the reception of the transmitted command. However, as some commands may not require a beep, the option of applying a packet loss concealment algorithm may be preferred. Muting of the output signal is the most basic way to minimize the effect of the missing audio information, while packet loss concealment extrapolation is preferred.

As in the example of FIG. 13, the control data packet 50 may start with a predefined flag acting as a marker for distinguishing control data from audio data. If a 32 bits flag is used, the probability to find the flag in a random bit stream is $\frac{1}{2}^{32}$. Given that the flag is always to be searched for at a given location (e.g., at the beginning of the packet), the average interval between detection of a flag in a random bit stream is:

$$2^{32}\times T_A=2^{32}\times 4\times 10^{-3}=198 \text{ days.}$$

In addition, a CRC word at the end of the packet will protect against false detections.

Alternatively, the control data marker could be realized as a signaling bit in the header of the audio data packet. Such marker enables the receiver unit 14 to detect that audio data has been replaced by control data in a packet. Since the data transmission in the example of FIG. 14 is non-redundant, each audio data packet and each control data packet is transmitted only once.

Figure 15:
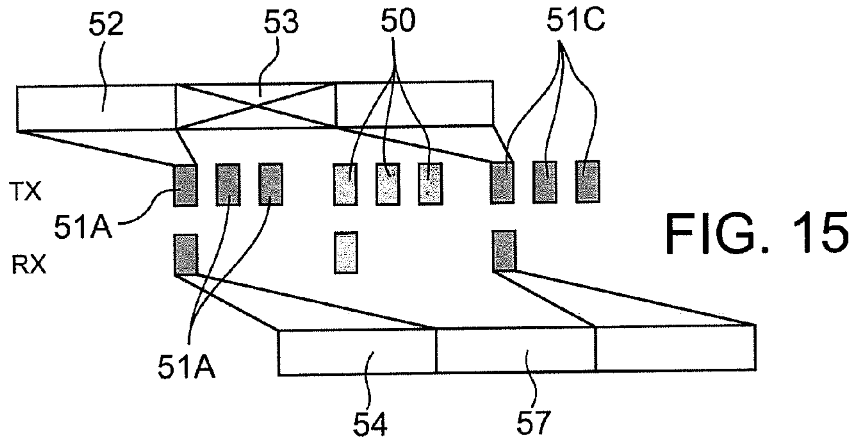

In the example of FIG. 15, the principle of the embodiment of FIG. 14 is applied to a redundant data transmission scheme, such as the scheme described above with regard to FIGS. 7 to 10, wherein each audio data packet 51A, 51C and each control data packet 50 is transmitted at least twice in a frame (in the example specifically shown in FIG. 15, each data packet is transmitted three times in the same frame).

In the examples of FIG. 14 and FIG. 15 in each frame in which there is transmission of a control data block there is no transmission of audio data packets.

Figure 16:
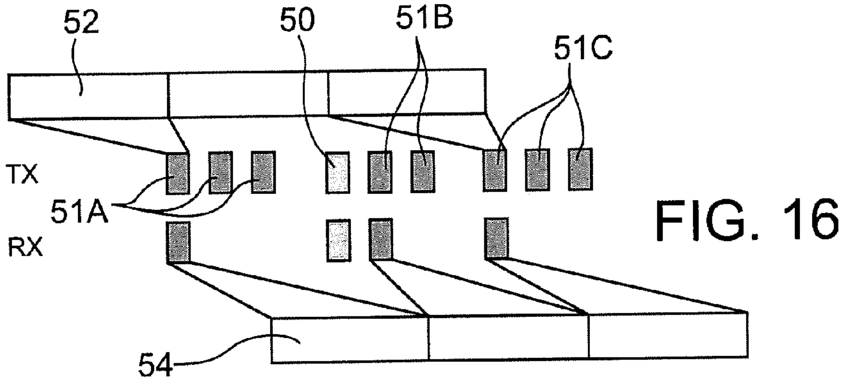

In FIG. 16, an alternative to the redundant data transmission scheme of FIG. 15 is illustrated, wherein, in contrast to the embodiment of FIG. 15, not all audio data blocks of the respective frame are replaced by the control data packets 50, but only the first one of the audio data packets 51B is replaced by a control data packet 50. Accordingly, in the second frame shown in FIG. 16, transmission of the control data packet 50 is followed by two subsequent transmissions of the audio data packet 51B.

As also indicated in FIG. 16 and already described above, the transmission unit 14 in each frame only listens until the first one of the identical audio data packets has been successfully received, see first and third frame shown in FIG. 16. However, when the receiver unit 14 detects that the received data packet is a control data packet rather than an audio data packet, it continues to listen until the first one of the audio data packets 51 be of the frame in which the control data packet 50 has been successfully received. To this end, the control data block 50 may include a signaling bit indicating that reception of one of the redundant copies of the audio data blocks 51B can be expected within the same frame.

The content of the received redundant audio data block copy 51B may be used for "masking" the loss of audio data caused by replacement of the first copy of the audio data packets 51B by the control data packet 50 (in fact, in case that one of the two remaining copies of the audio data packets 51B is received by the receiver unit 14, there is no loss in audio data caused by replacement of the first audio data packet 51B by the control data packet 50). Thus, the decompressed audio data stream 54 remains uninterrupted even during that frame when the control data packet 50 is transmitted, since then the second copy of the audio data packet 51B is received and decompressed, see FIG. 16.

The embodiment of FIG. 15, wherein all copies of a certain audio data packet are replaced by corresponding copies of the control data packet, provides for particularly high reliability of the transmission of the control data packet 50, whereas in the embodiment shown in FIG. 16 loss in audio data information caused by control data transmission is minimized.

Figure 17:
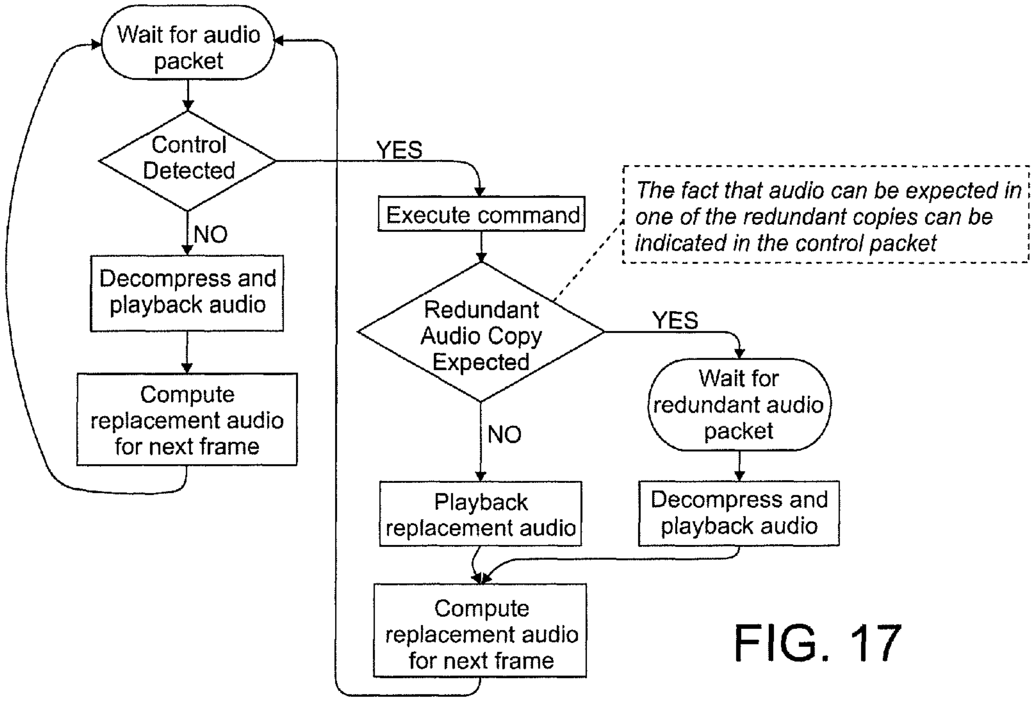
FIG. 17 shows an algorithm for the handling of control data in accordance with the audio data and control data transmission method of FIG. 16.

FIG. 17 shows an example of an algorithm for the implementation of the transmission methods shown in FIGS. 15 and 16.

It is noted that the invention may be combined with one of the prior art transmission schemes. For example, the method shown in FIG. 11C, wherein dedicated control packets, i.e., beacons, are used for control data transmission, may be combined with one of the methods of FIGS. 14 to 16. For example, when potential delay of control data transmission is of little relevance, control data may be transmitted via the beacons, whereas in case when control data transmission delay is critical control data may be transmitted by replacement of audio data.

One example for a control command for which low delay is desirable is a "mute" command wherein ear level receiver units 14 are set in a "mute" state when the microphone arrangement 17 of the transmission unit 10 detects that the speaker using the microphone arrangement 17 is silent. Transmitting the mute command via the beacon would take much time, since the beacon, in the above system, is received by ear level receiver units every 128 ms, for example. When applying replacement of audio data by control data packets according to the invention, in the above example, a maximum delay of 4 ms is reached for the transmission of such "mute" command.

What is claimed is:

1. A method for providing sound to at least one user, comprising:

supplying audio signals from an audio signal source to a transmission unit, wherein the transmission unit includes:

a digital transmitter for applying a digital modulation scheme and compressing the audio signals to generate compressed audio data;

transmitting the compressed audio data as audio data packets via a digital wireless link from the transmission unit to at least one receiver unit comprising at least one digital receiver;

decompressing the audio data to generate decompressed audio signals; and stimulating the hearing of the at least one user according to decompressed audio signals supplied from the receiver unit, wherein each data packet is transmitted in a separate slot of a time-division multiple access (TDMA) frame at a different frequency according to a frequency hopping sequence, wherein in at least some of the slots the audio signals are transmitted as audio data packets, wherein the same audio packet is transmitted at least twice in the same TDMA frame, without expecting acknowledgement messages from the at least one receiver unit, and wherein the TDMA frames are structured for unidirectional broadcast transmission of the audio data packets;

wherein, during certain frames, at least one of the redundant transmissions of compressed audio signal data packets is omitted in favor of transmission of at least one control data block generated by the transmission unit via the digital wireless link, each control data block including a marker for being recognized by the at least one receiver unit as a control data block and a command for being used for control of the receiver unit.

2. The method of claim 1, wherein each control data block includes information as to whether subsequent transmission of a redundant audio data packet is to be expected.

3. A system for providing sound to at least one user, comprising:

at least one audio signal source for providing audio signals;

a transmission unit comprising means for compressing the audio signals to generate compressed audio data, means for generating control data blocks and a digital transmitter for transmitting compressed audio data and control data blocks via a wireless digital link;

at least one receiver unit for reception of compressed audio data from the transmission unit via the digital link, comprising at least one digital receiver and means for decompressing the compressed audio data to generate decompressed audio signals;

means for stimulating the hearing of the at least one user according to decompressed audio signals supplied from the receiver unit;

wherein the transmission unit is designed such that each data packet is transmitted in a separate slot of a time-division multiple access (TDMA) frame at a different frequency according to a frequency hopping sequence, wherein in at least some of the slots the audio signals are transmitted as audio data packets, wherein the same audio packet is transmitted at least twice in the same TDMA frame, without expecting acknowledgement messages from the at least one receiver unit, and wherein the TDMA frames are structured for unidirectional broadcast transmission of the audio data packets;

wherein the transmission unit comprises a control data block insertion unit for omitting, during certain frames, at least one of the redundant transmissions of compressed audio signal data packets in favor of transmission of at least one control data block generated by the transmission unit via the digital wireless link, each control data block including a marker for being recognized by the at least one receiver unit as a control data block and a command for being used for control of the receiver unit.

4. The method of claim 1, wherein the receiving unit is a hearing aid.

5. The method of claim 1, further comprising:

masking the absence of the audio data packets during control data block transmission by generating a masking output audio signal, muting the audio signal provided to the user, applying a pitch regeneration algorithm, or applying packet loss concealment extrapolation to the decompressed audio signals.

6. The method of claim 1, wherein the transmission unit is one of the following:

a mobile phone;

a music player;

a FM radio;

a telephone; or a TV.

7. The system of claim 4, wherein the receiver unit is a hearing aid.

8. The system of claim 4, wherein the means for stimulating the hearing of the at least one user is further configured to:

mask the absence of the audio data packets during control data block transmission by generating a masking output audio signal, mute the audio signal provided to the user, apply a pitch regeneration algorithm, or apply packet loss concealment extrapolation to the decompressed audio signals.

9. The system of claim 4, wherein the transmission unit is one of the following:

a mobile phone;

a music player;

a FM radio;

a telephone; or a TV.

10. A method for providing sound, the method comprising:

receiving audio signals;

compressing the audio signals to generate compressed audio data;

transmitting the compressed audio data as audio data packets via a digital wireless link from a transmission unit to a receiver unit;

decompressing the audio data to generate decompressed audio signals; and providing, via the receiver unit, the decompressed audio signals to a user, wherein at least some of the audio data packets are transmitted in a separate slot of a time-slotted frame at a different frequency based on a frequency hopping sequence, wherein at least some audio data packets are repeated in the time-slotted frame;

wherein at least one of the audio data packets are replaced with a control data block, and wherein the control data block includes a marker to indicate a command to be used as a control signal by the receiver unit.

11. The method of claim 10, further comprising:

masking the absence of the audio data packets during control data block transmission by generating a masking output audio signal, muting the audio signal provided to the user, applying a pitch regeneration algorithm, or applying packet loss concealment extrapolation to the decompressed audio signals.

12. The method of claim 10, wherein the receiver unit is a hearing aid.

13. The method of claim 10, wherein each of the audio data packets comprises a start frame delimiter (SFD) and a frame check sequence.

14. The method of claim 10, further comprising:

determining that one of the audio data packets was missed or lost;

waking up before a retransmission of the missed or lost audio data packet; and receiving the retransmission of the missed or lost audio data packet.

15. The method of claim 10, further comprising:

determine whether the transmitted audio data packets includes control data or audio data packets; and using the control data to adjust an operation of the receiver unit.

* * * * *